United States Patent [19]
Bastgen

[11] 3,871,285
[45] Mar. 18, 1975

[54] INCINERATOR DEVICE AND A METHOD OF PROCESSING RESIDUALS IN WASTE WATER, LIQUEFIED SEWAGE AND SLUDGE

[75] Inventor: Wendel Bastgen, Betzdorf near Siegen, Germany

[73] Assignee: Albert Klein KG, Nieder-Fishbach, Germany

[22] Filed: Oct. 19, 1973

[21] Appl. No.: 408,116

[30] Foreign Application Priority Data
Oct. 19, 1972 Germany........................ 2251211
June 9, 1973 Germany........................ 2329626

[52] U.S. Cl..................... 110/8 R, 110/14, 110/15, 110/38
[51] Int. Cl. ............................................. F23g 5/00
[58] Field of Search................. 110/8 R, 14, 15, 38; 34/164; 122/376

[56] References Cited
UNITED STATES PATENTS

| | | | |
|---|---|---|---|
| 41,905 | 3/1864 | Chichester............................ | 34/164 |
| 633,301 | 9/1899 | Wegener.............................. | 110/14 |
| 2,577,659 | 12/1951 | Knipping.............................. | 110/15 |
| 2,848,959 | 8/1958 | Craig ................................. | 110/38 |
| 2,932,264 | 4/1960 | Hurst.................................. | 110/38 |
| 2,971,508 | 2/1961 | Rivers................................. | 110/38 X |
| 3,329,107 | 7/1967 | Hatchel et al. ....................... | 110/15 |
| 3,734,036 | 5/1973 | Abos................................... | 110/15 |
| 3,780,676 | 12/1973 | Hazzard et al........................ | 110/14 |

*Primary Examiner*—Kenneth W. Sprague
*Attorney, Agent, or Firm*—Hane, Baxley & Spiecens

[57] ABSTRACT

There is disclosed an incinerator device for burning granulated or otherwise fractured combustible material. The incinerator comprises a grate to which is fed combustion air from below. The grate is in the form of a sieve or a sieve insert which is swingably mounted and to which swinging motions are imparted.

There is also disclosed a method for processing residuals in waste water, liquefied sewage and liquefied sludge. According to the method, part of the moisture content of flowable material to be processed is removed and the solids in the waste water, sewage or sludge are fractured to desired sizes after partially drying the same. The thus obtained granulate is then dried by applying heat thereto. Finally, if desired, the now dried granulated material is burned preferably by using a glowing or hot bed continually coacting with an air cushion.

31 Claims, 2 Drawing Figures

INCINERATOR DEVICE AND A METHOD OF PROCESSING RESIDUALS IN WASTE WATER, LIQUEFIED SEWAGE AND SLUDGE

The invention relates to an incinerator with at least one grate fed from its bottom side with combustion air for burning granulated combustible material and also to a method of processing residuals in waste water, liquefied sewage, liquefied sludge, etc., in the incinerator.

BACKGROUND

Incinerators of the general type above referred to are known as so-called Martin furnaces. Such furnaces comprise slidable grates with alternating fixed and movable grate bars which are disposed above under grate air blowers. The combustible material to be processed moves downwardly on such grates. There are also known traveling grates with undergrate blowers, particularly with adjustable grate zones for metering the feed of combustion air. With this type of grates, heavy cast iron or highly heat-resistant steels are used. If a high load to be applied to the grates, auxiliary water cooling must be provided. Grates of this kind have only a limited applicability. In particular, they cannot be used for burning finely grained combustible materials and more specifically, they cannot be used for flowable solids as such material would drop through between the necessarily widely spaced grate rods.

In the event large grained or lumpy combustible materials are to be processed, it must be assured that — similar as it occurs during drying — no unburned zones remain within the interior of the chunks. Such zones tend to occur as the core of the chunks is to some extent shielded against the ambient heat causing the burning. As heretofore known, preparation of sludge to be processed by burning is effected only in furnaces having several stages with cooled raking arms or in so-called eddy layer furnaces. This type of operation requires a disproportionally high power input to obtain a continous removal of the forming layer of slag or of ash.

The aforepointed out disadvantages have led to a method of processing residuals in waste water to a product which can be stored or further processed in an economically acceptable manner which has not been developed hereinbefore. The dewatering of the material by application of heat is impractical due to the high power requirements. Known devices for mechanically dewatering are either not capable of processing the required large quantities, or are also not capable of processing residuals in waste water or sludges due to the extraordinarly wide differences in the particle or grain sizes in which the residuals occur due to the widely different composition of such residuals.

To increase the economics of garbage processing, it has been proposed to convert the garbage to be processed to ash to save power and then to convert the ash to humus if possible. Installations for this purpose are shown, for instance, in German published Patent applications Nos. 1,526,089 and 1,526,088. In such installations burning of the garbage is effected in furnaces with stepped grates. These grates are intended to effect a loosening and thorough mixing of the layers to be burned. However, such grates are bound to be too heavy and too coarse to be acceptable for the processing of sludges and similar materials.

THE INVENTION

It is an object of the present invention to provide an incinerator device and also a method of the herein-described type in which the aforepointed out disadvantages are eliminated.

More specifically, the invention provides processing of waste water, sludges or sewage in an economically acceptable manner, that is, in a manner such that the operation is adaptable to the specific requirements and the differences of the raw material as caused by changes of the annual seasons. More particularly, the incinerator of the invention permits processing of finely grated material by means of grates suitable for such materials, and to effect converting the material into ash without remaining unburned cores within the material.

The aforepointed out objects, and other ojects which will be pointed out hereinafter, are obtained by providing incinerating devices so that the grates are in the form of sieves such as perforated bands or sieve inserts and are pivotaly or swingably mounted.

It is particularly advantageous to dispose the sieve or sieve insert so that it partly overlies an about trough-shaped under structure for feeding the combustion air or other substances to the sieve or sieve insert. The sieve or sieve insert is freely swingably mounted on suitable supports therefor and may be provided with a drive means for generating swinging motions of the sieve or sieve insert, such as a vibrator.

The grate in such incinerator device is preferably arranged in the form of a swinging sieve. Such mounting would not be suitable for heavy grates as now known. Swinging sieves have heretofore not been used for combustion purposes since the layer on the sieve tends to become too hot due to the effect of a hot or glowing bed overlying the same.

However, it has been found that with an incincerating device according to the invention, due to the uniform arrangement of small sieve openings and the efficient distribution of air in the trough-shaped under frame, a very strong cooling is obtained at the grate itself. Moreover, when the amplitude and the frequency of the swinging under frame or another suitably designed swingable bottom are suitably selected, only a very short contact between the sieve insert and the glowing or hot bed occurs. It has been found that the time of contact is about one-fourth of the total dwell time of the material in the incinerating device. During the remaining time required for passage of the material through the device, there is formed above the sieve insert a continuously self-renewing cool air layer or cushion which causes an additional cooling. Only after the aforepointed out discoveries had been made by the inventor, did it become possible to conceive a grate in the form of a sieve bottom preferably made of thin sheet metal such as a steel sheet, with a plurality of preferably uniformly disposed air passage openings. In other words, the inventor realized that it would be feasible to provide sieves in spite of the low mechanical strength and high sensitivity of such sieves as grates in incinerator devices.

It has been found to be particularly advisable to arrange the openings in the sieves somewhat in the manner of the arrangement of the openings in a grater as used in the kitchen, that is, with partly overhanging protrusions of the sheet metal itself. Air passage openings of this type can be easily manufactured. They are inexpensive and permit accurate control of the air flow. It depends upon the requirements of the specific situation whether between each protrusion the remaining opening is disposed in opposition to the glowing or hot bed passage or in the direction thereof. If arranged in the direction of the passage of the hot bed, the glowing or hot bed will become uniform, but if disposed in opposition an eddy effect is obtained. All such arrangements are within the concept of the invention and also an arrangement in which openings are provided with overhangs alternating in direction.

According to a further aspect of the invention, the grate can also be composed of spaced apart rods or in the form of a densely meshed sieve. The use of a densely meshed sieve has the advantage that a highly uniform distribution of the primary or initial combustion air flow over the total area of the grate is assured.

The last referred to advantage can be further increased by arranging air chambers under the area of the gate. Even if there is an extremely low air excess as it is necessary to obtain high burn temperatures and hence a good burning action, no oxygen-poor zones are formed in which an incomplete burning may occur. This is, of course, also true for sieve-type grates of the type hereinbefore described.

To obtain the desired swinging of the grate, the device used for obtaining the swinging movements of the grate are preferably disposed relative to the horizontally oriented surface of the grate at an angle of about 45° to slightly less than 90°. Moreover, leaf springs have been found to be advantageous as swinging members. The combustible material placed on the grate is subjected by vibrations as produced by the vibrator to a vertical and also a horizontal direction, preferably with a component of force directed toward the exit of the space within which burning occurs. The magnitude of this component of force is adjustable; as a result, a high adjustability is obtained by a simple and reliable control and also by the adjustability of substantially parabolic movements as performed by the granules of which the material to be burned is composed. These parabolic movements have a highly advantageous effect upon the combustion product which is obtained.

The conbustible material moves over the area of the swinging grate and a cushion of air or similar gaseous is produced between the grate surface and the combustible material itself. The combustible material then dips repeatedly into this cushion for a short period of time. Such cushion is produced by a cold or upwardly directed air flow through the sieve-type grate. The cold air serves simultaneously as primary air for the burning operation.

According to still another object of the invention, the combustible material travels generally along parabolic throw paths along the surface of the grate. The amplitude and length of the motions performed by the granules of which the combustible material is formed, can be controlled by the swinging movements of the grate as determined in advance.

It has been found in practice that such sieve-type grates operate with a particularly high efficiency when resonance vibrations are used, the resonance frequency of which is rather close to the inherent frequency magnitude of the grate. By selecting such frequency one obtains nearly uniform r.p.m. of the drive means even if there are variations in the voltage as supplied by the power source. Moreover, a good utilization of the power input, a quiet running of the drive and high operational reliability are assured.

To obtain a satisfactory distribution of the air flow, the generally trough-shaped lower or under frame is provided, according to still another aspect of the invention, with at least one feed conduit for combustion air and cold air; this conduit should be widened from the under frame toward the grate.

For the same purpose, the bottom of the trough-shaped under frame may be slanted relative to the plane of the grate.

The air flowing through the openings in the grate cooling the same as described, then after affecting the burning operation, flows together with or as a part of the exhaust gases and the smoke out of the upper side of the glowing or hot bed. A generally funnel-shaped hood according to the invention facilitates the passage of the gases and the smoke through a discharge pipe.

The incinerator device is preferably provided with a fracturing device and/or a drying device. Such devices should be provided in upstream position, at least when the combustible material to be processed, for instance clearing or purification sludge is fed in a comparatively moist condition. It has been found in this connection that so-called revolving tube dryers with at least two concentrically arranged revolving tubes are particularly advantageous. Such dryers are compact and thus occupy comparatively small space and they have exceedingly low radiation losses as the radiated heat of the one or more inner tubes can be utilized in the outer tubes. Revolving tube dryers are known as drying devices, but not in the combination according to the invention, in which the aforedescribed incinerator devices have new and surprising advantages for burning finely grained combustible material or granulated residues, especially when the incinerator device and a revolving tube dryer or similar dryer are disposed in a combustion air circulating system. The drying of the fedin material so as to constitute a substantially uniformly grained and flowable combustible material or a fertilizer which has a loose gas-pervious inner structure and can be conveniently scattered. These products are obtained at low costs if they can at least partly be affected by the waste gases released during the burning operation.

The drying is preferably effected by the aforementioned revolving tube dryers. Such dryers produce when used for processing, clearing or purification sludges, usually a chunky dried product with a partly wet core and a completely dry outer layer. A sharp drying at a high temperature gradient is then no longer possible as otherwise the outer layer is burned prematurely. Heretofore, a further drying could be obtained only with very large installations and at a low efficiency.

In view of these facts, the revolving tube dryer is so adjusted according to the invention that the flowable material is processed in the inner tube of the dryer in the presence of a high temperature gradient and simultaneous action of grinding members. The flowable material is then uniformly granulated and flowable; it also has a loose gas-pervious inner structure. The material is now fed into annular or inner spaces of the dryer in which further drying is effected at a low temperature gradient and at good heat transfer due to high feed velocities.

Preferably, a filtering installation is provided ahead of the dryer to effect dewatering of fed-in highly liquid sludges until a chunky material is obtained. Catch basins for collecting liquid are provided and the collected liquid may be fed to the gas washing device in the dryer. Such arrangement constitutes a further utilization of a byproduct as part of the processing operation.

To adapt the obtained finished product to the specific requirements, the installation is so arranged that material can be withdrawn either ahead of the dryer or ahead of the incinerator proper.

If the material is withdrawn ahead of the dryer, the result is a moist composte fertilizer in the form of partly dewatered press cakes. If the material is withdrawn after the dryer, the product is either a partly dried granulate in case of low heating or a fully dried product which is sterilized by high heat and can be used as fertilizer capable of being scattered. When the material passes the incinerator device it emerges therefrom in the form of ash or partly burned material.

The aforepointed out high adjustability of the incinerator device according to the invention and also the disclosed process make unnecessary to maintain a large inventory to adapt to the changes in conditions as caused by the change in the seasons or to comply with the specific requirements of consumers.

BRIEF DESCRIPTION OF THE INVENTION

In the accompanying drawing, preferred embodiments of the invention are shown by way of illustration and not by way of limitation.

In the drawing:

FIG. 1 is a diagrammatic elevational view of the incinerator device with an anteriorly disposed revolving tube dryer; and FIG. 2 is a diagrammatic elevational view of a processing installation with an interposed incinerator.

DETAILED DESCRIPTION OF THE DRAWING

Figure 1:
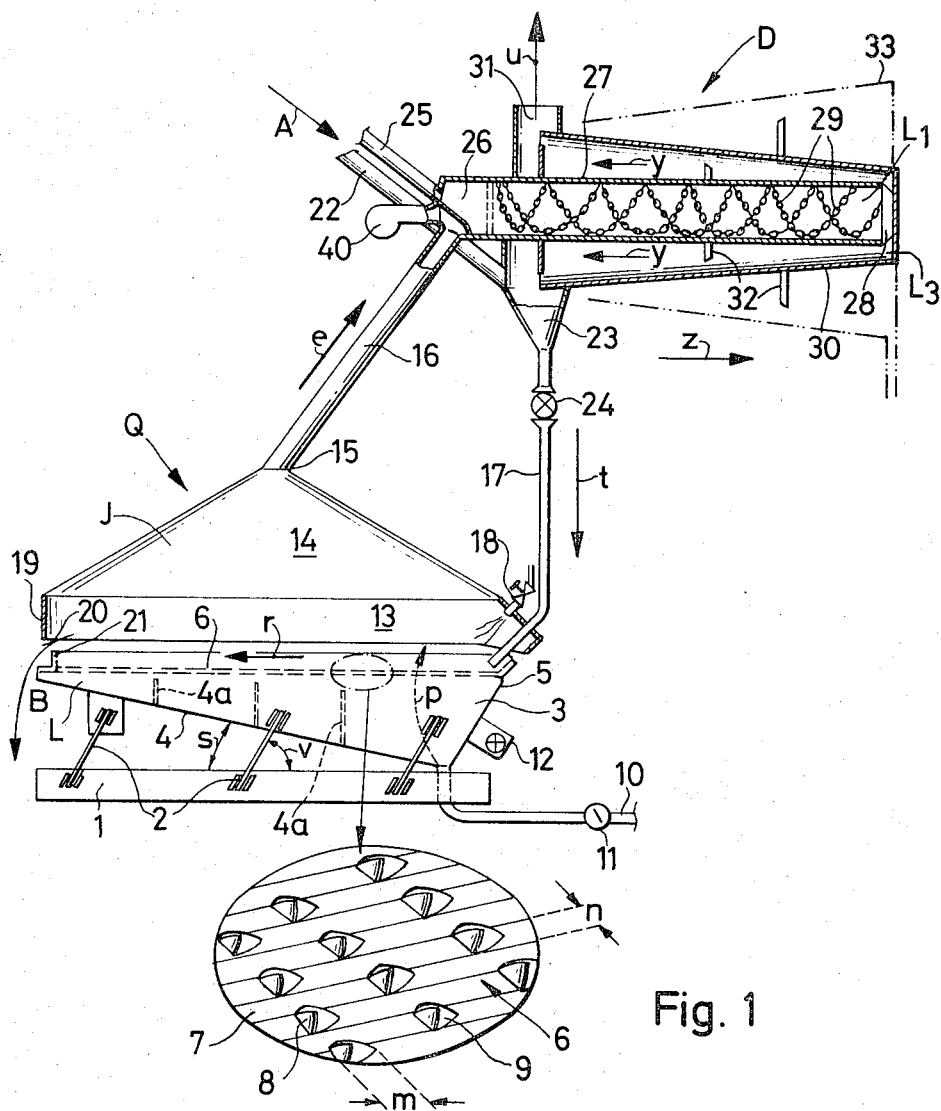

An incinerator device Q comprises a base or foundation 1 mounting a pivotable or swingable trough 3. This trough is secured to the foundation by several leaf springs 2 disposed at an angle v (for instance a 60° angle). The bottom 4 of trough 3 defines relative to the foundation 1 which is horizontally disposed, an angle of about 10°. The base 4 in conjunction with an also slanted end wall 5 of swingable trough 3, constitutes a support for a sieve insert 6, which has a funnel-shaped configuration in lengthwise direction. Trough 3 includes several vertically disposed crosswise partiions 4a forming air chambers L in the trough. The relative pressure in these chambers can be regulated to obtain pressure differentials between the chambers to effect desired proportional air feeds. Soeve insert 6 comprises a plate 7 preferably made of sheet metal such as steel and has an average area of five square meters for a burning or incinerating output of up to 500 kg/h. The plate includes a plurality of elongate cutouts 8 with a slanted length $m$, for instance about 3 mm, and a width $n$, for instance of 0.8 mm. The cutouts or openings are preferably disposed rather close to each other and regularly distributed. Part of the openings are overlaid by protrusions 9 similar to the manner as is used for a so-called grater. An air input conduit 10 including a throttle valve 11 communicates with the deepest point in the bottom of the trough. A vibrator or exciter 12 is provided in trough wall 5 above the input opening of conduit 10.

A frame 13 preferably formed of sheet metal surrounds sieve insert 6 and is connected to a hood 14 which is made of a suitable material such as steel and tapered toward its upper end. The top 15 of the hood is connected to a discharge pipe 16 which thus connects with the space J within the hood.

Wall 5 of the trough connects a feed duct 17 and also to a burner 18. The pipe 17 and the burner 18 are disposed parallel to each other and extend into the inner space J within the hood. The opposite face wall 19 of swingable trough 3 and the frame 13 include a discharge opening 20. In this opening is fitted an overflow rib 21 continued by a discharge chute 20a. Material A to be incinerated, for instance, predried sewage or sludge, is fed into the feed conduit 17 of incinerator Q either directly via conduit 22 and and a funnel 23 equipped with a metering device 24, or via a conduit 25 first to the feed-in chute 26 of a revolving tube dryer D. The central revolving tube 27 in dryer D convey the material A which is presumed to have a moisture content of for instance 70%, in the direction of arrow $z$ to a discharge 28 for the tube 27. It is in the condition of a uniformly predried flowable combustible material with a loose and gas-pervious inner structure after it has passed through the inner space $L_1$ through which a hot air flow is directed. It is also ground up or otherwise fractured by the grinding motions to which it is subjected in the central tube 27 and the flyingly mounted braking or granulation effecting chains 29. Finally, the combustible material is fed into the space $L_3$ formed by the outer shell 30 of the revolving tube dryer, said shell being coaxially disposed with the central tube 27. In this space $L_3$ regularly disposed beaters 32 act upon the combustible material A. The drying air flows from the exit 28 of the central tube into the space within shell 30 of the revolving tube dryer in the direction of arrow $y$ and finally out through smoke and gas discharge funnel 31.

The dash-dotted outlines 33 in FIG. 1 indicate that additional concentric shells of a suitable revolving tube dryer can be coupled to the installation as hereinbefore described.

The preliminarily processed combustible material A now enters into the metering device 24 and then travels from there along the same way as the combustible material which is fed via the described conduit 22. It drops in the direction $t$ through the feed conduit 17 upon the sieve insert 6 and travels on this insert in the direction $r$ due to the action of the vibrations of the sieve on the grate insert as generated by vibrator 12 to the discharge opening 20. As the material travels toward discharge opening 20 the granules of which the material is composed lift themselves continuously in about parabolically shaped movements above the surface of sieve insert 6.

Simultaneoulsy, combustion air $p$ is fed via the air feed pipe 10 into trough 3 or the air chambers L therein. This combustion air is then blown through the numerous openings 8 in plate 7. The combustion air $p$ formed between sieve insert 6 and a not shown hot or glowing bed to a cooling air cushion which serves as supply for the primary air as is required for the burning operation.

The granules or particles to be burned dip into this air cushion when and while they perform the aforereferred to substantially parabolic movements or jumps. If the amplitude and the frequency of the swinging movements of trough 3 are correctly set, there is only each time a short contact between the particles or granules and the sieve insert 6. The total touch time is at the most one-fourth of the dwell time of the material to be burned as the same travels from the feed conduit 17 to discharge opening 20 through which the remaining ash falls upon the chute 20a.

The rising air flows out through discharge pipe 16 (arrow e) to the revolving tube dryer D and is fed into the dryer as drying air. If necessary or desired, an air heating device 40 can be provided upstream of the revolving tube dryer D.

Figure 2:
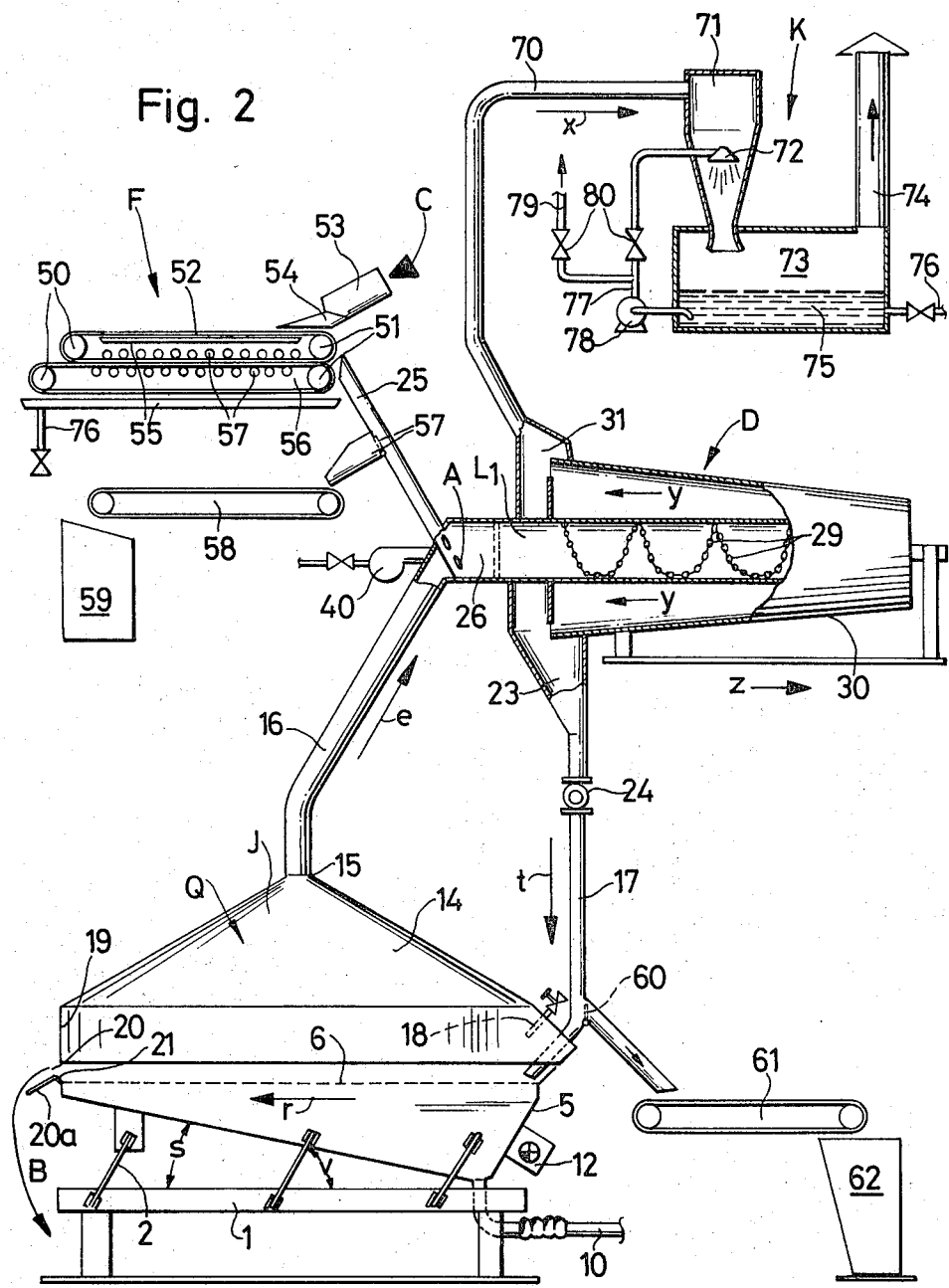

FIG. 2 shows as a further component of the described assembly D, Q, a press F including an endless perforated or sieve band which is guided over pulleys 50,51; the upper or working part 52 of the band is charged with highly diluted or flowable sludge C by means of a feed device 53 between aprons 54 disposed on both sides of the feed device. Placement of the highly flowable sludge on band part 52 partly dewaters the sludge. The removed liquid as it drops through the perforations in the band is caught in a catch basin 55 disposed below the band. When reaching pulley 50 disposed at the discharge end of the band, the thus preliminarily dewatered sludge C falls upon a second endless perforated band 56 which carries the sludge to conduit 25. The first perforated band 52 and also the second perforated band 56 which may be formed of monafilic metal wire or threads of a synthetic plastic, serves as pressure band for the sludge cake C to be dewatered.

A number of small rolls 57 coact with the upper pressure band part 52 and also with the lower perforated band part 56 and force these bands into spaced apart positions. As a result, the sludge cake between the bands is subjected to pressure and also to shear forces. These shear forces compact the sludge cake thereby producing an extraordinarily high degree of dewatering. The highly flowable sludge when fed to the bands may contain for instance 95% water and when reaching the end of the press F formed by the bands emerges as a press cake A having a water content of about 70%; it also is discharged in the form of pieces of about the size of the palm of a hand and is resistant to piercing.

After passing press F, the press cake A can be fed either to the revolving dryer D or via a diverter or deflector switch 57 and a conveyor band 58 to a silo 50 to be used as composte or moist fertilizer.

A deflector 60 disposed downstream of the revolving tube dryer D — prior to the connection of the conduit 17 with the incinerator Q — permits direction of the combustible material A either to the incinerator Q or via a chain conveyor 61 to a further silo 62 for use as spreadable fertilizer.

FIG. 2 also shows a purification installation K disposed above the revolving tube dryer D. This installation is provided for cleaning the fumes or gases discharged via the funnel or smokestack 31. These fumes flow through a riser 70 in a washing cyclone 71 which is conically tapered in the flow direction of the gases or fumes. This cyclone includes a spray head 72 through which water is sprayed upon the passing fumes or gases and is collected in a washbasin 73. The thus washed gases or fumes escape from the basin and the cyclone via a stack 74 while the washing water remains in basin 75.

The water basin 75 can be filled via a pipe 76 which is filtering water obtained from the press F comprising the aforedescribed bands. Another pipe or conduit 77 into which a rotary pump 78 or other suitable pump is included, supplies water to spray head 72 of the washing cyclone 71. A branch pipe 79, after suitable adjustment of valve 80, permits discharge of excess washing water, for instance into a settling basin from which the highly flowable sludge C is taken for processing.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A device for incinerating granulated combustible material, said device comprising in combination:
   at least one sieve-type grate for feeding combustible material thereupon, said grate being in the form of a rigid plate-shaped member having spaced apart perforations, the peripheral outline of each of said perforations being small in relation to the total area of said plate-shaped member;
   support means mounting said grate for imparting swinging movements to the same, said support means including a generally trough-shaped structure disposed underneath said grate and mounting the same;
   at least one swingable member supporting said structure for imparting swinging movements to the structure and the grate;
   exciter means coupled to said swingable member for imparting swinging movements to the same; and
   air supply means connected to the trough-shaped structure for continuously feeding air into said structure to form an air cushion therein thereby continuously cooling the grate.

2. The device according to claim 1 wherein protrusions extend from the rims of said perforations each overlying at least part of the respective perforation, the remaining clear portions of the perforations facing in the same direction.

3. The device according to claim 1 wherein said swingable member comprises an elongate elastic member, said elastic member defining an angle relative to the plate-shaped grate member.

4. The device according to claim 1 wherein said exciter means are arranged to impart to the structure and thus to the grate swinging movements at the resonance frequency.

5. The device according to claim 1 wherein said grate is substantially horizontally disposed and constitutes a top wall for said trough-shaped structure, and wherein said trough-shaped structure comprises side walls downward slanted toward each other so as to define a space broadened toward the grate, said air supply means being connected to a narrow portion of said space thereby distributing the flow of the air over the area of the grate for cooling the same.

6. The device according to claim 5 wherein said frame structure includes air chambers, said air chambers communicating with the grate.

7. The device according to claim 6 wherein air distributing means are supported by said trough-shaped structure, said distributing means distributing the combustion air over the area of the grate.

8. The device according to claim 1 wherein a hood is disposed above the grate, said hood and said grate defining a burning space for material to be incinerated.

9. The device according to claim 8 wherein a side wall encompassing at least part of the peripheral outline of the grate and joined to the rim of the hood is interposed between the grate and the hood thereby correspondingly enlarging said burning space.

10. The device according to claim 9 wherein an ignition means is provided, said ignition means extending through a wall of said hood.

11. The device according to claim 10 wherein a feed conduit for feeding material to be incinerated extens into said burning space through a hood wall.

12. The device according to claim 11 wherein a granulating means for granulating material to be incinerated is included in said feed conduit upstream of the ignition means.

13. The device according to claim 11 and comprising a drying means for predrying material to be incinerated into said feed conduit.

14. The device according to claim 13 wherein a stack for dissipating smoke and vapors communicates with said burning space via said feed conduit, said drying means being in communication with said stack.

15. The device according to claim 13 wherein said burning chamber and said drying means are included in an air circulating system.

16. The device according to claim 13 wherein said drying means comprises a rotary dryer including at least two concentrically disposed rotatable tubes.

17. The device according to claim 13 wherein at least one filter means including a pressure means is disposed upstream of said drying means.

18. The device according to claim 17 wherein said pressure means comprise a perforated conveyor band and pressure members coacting with said conveyor band for pressing out moisture contained in material on said band.

19. The device according to claim 17 wherein a washing means is provided downstream of the drying means and the filter means for washing vapors and gases emanating from the drying means.

20. The device according to claim 13 wherein at least one deflecting means is interposed between the drying means and the burning chamber for diverting partly processed material to a storage area.

21. A method of processing residuals in waste water, sewage or sludge, said method comprising the steps of providing an incinerator installation including at least one sieve-type grate in the form of a perforated plate and supply means for continuously feeding air to the grate from below thereby cooling the same, preliminarily drying the residuals by appling pressure thereto, granulating the predried residuals, continuously maintaining a bed of hot air above said grate, then continuously guiding the granulate in the form of a layer along said hot air bed, and imparting swinging movements to said layer causing the granulate to dip intermittently into the hot air bed as it passes over the same.

22. The method according to claim 21 and comprising the step of subjecting said layer to swinging movements along parabolic paths as it moves over the hot air bed by correspondingly controlling the swinging movements of said grate.

23. The method according to claim 22 wherein said layer as it moves along said hot air bed touches the surface of the grate for about one-fourth of the time required by granulates forming the layer to move along the hot air bed.

24. The method according to claim 21 and comprising the step of maintaining said hot air bed by continuously directing an air flow through the grate from below.

25. The device according to claim 24 wherein said air flow is a cold air flow, said cold air flow constituting fresh combustion air and also cooling the grate.

26. The method according to claim 21 comprising the steps of fracturing the residuals prior to incincerating the same so that the residuals are in the form of substantially uniform granules having a gas permeable core.

27. The method according to claim 21 and comprising the steps of providing upstream of the grate a drying means including a first central drying space, feeding the residuals into said first space, subjecting the residuals to a high temperature while in said first space causing drying of the residuals and simultaneously grinding the residuals to form granules capable of being scattered and having a gas permeable inner structure, then feeding the granules into a second space of the drying means, and finally subjecting the granules while in said second space to a high velocity air flow at a lower temperature than the first used drying temperature.

28. The method according to claim 27 wherein the heating of the air flows used for drying the residuals is obtained from gases released by and during the burning of residuals, and ignition means causing release of hot gases.

29. The method according to claim 28 and comprising the step of washing the released gas at least with waste water obtained by removal of water from the residuals to be processed.

30. The method according to claim 21 and comprising the step of diverting at least part of the residuals from the flow of residuals fed to said hot air bed.

31. The device according to claim 30 wherein the residuals are subjected to a drying operation prior to being diverted.

* * * * *